United States Patent [19]  
Kilian

[11] 3,839,268  
[45] Oct. 1, 1974

[54] POLYESTER RESIN COMPOSITION AND METHOD OF MAKING THE SAME

[75] Inventor: Paul E. Kilian, Tustin City, Calif.

[73] Assignee: Konel Molded Products Corporation, Muskegon, Mich.

[22] Filed: Apr. 15, 1971

[21] Appl. No.: 134,443

Related U.S. Application Data

[63] Continuation of Ser. No. 782,188, Dec. 9, 1968, abandoned.

[52] U.S. Cl. .............................. 260/40 R, 260/861
[51] Int. Cl. ........................................... C08g 51/04
[58] Field of Search ............................... 260/40 R

[56] References Cited
UNITED STATES PATENTS

| | | | |
|---|---|---|---|
| 3,227,665 | 1/1966 | Fourcade et al. | 260/40 R X |
| 3,557,042 | 1/1971 | Dolhuisen | 260/31.2 |

OTHER PUBLICATIONS

H. R. Simonds, ed., "Ency. of Plastics Equipment" (1964) p. 361–362.
R. B. White, "Premix Molding" (1964), pp. 58–65.
C. E. Schildknecht, "Polymer Processes" (1956) pp. 772–776.

*Primary Examiner*—Morris Liebman
*Assistant Examiner*—S. M. Person
*Attorney, Agent, or Firm*—Price, Heneveld, Huizenga & Cooper

[57] ABSTRACT

This disclosure relates to a moldable polyester composition and to a process for making the same. The process comprises mixing a filler with a polyester by subjecting the polyester to high shear rates as the filler is added thereto until a sharp decrease in viscosity is observed. The filler blending step is characterized by a temperature above room temperature and less than 120°F. A vinylidene-containing monomer copolymerizable with the polyester, a catalyst and a fibrous reinforcing material is added to the polyester resin after the filler mixing step and while the mixture is at an elevated temperature. The fibrous reinforcing material is quickly blended into the mixture in a time insufficient to destroy the integrity of the strand structure and so that the mixture maintains its low viscosity. The polyester composition, thus compounded, can be cured in suitable mold cavities to make articles which simulate natural materials and have exceptionally high surface reproduction fidelity. The products produced have the appearance, feel and sound of wood.

37 Claims, 11 Drawing Figures

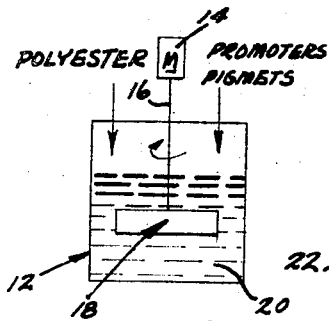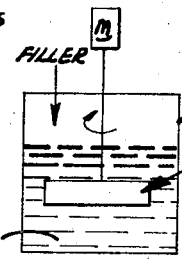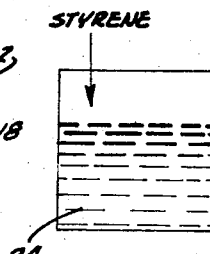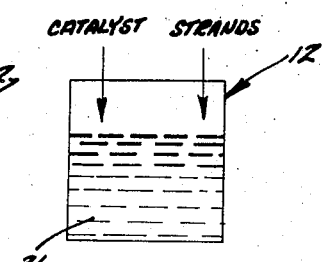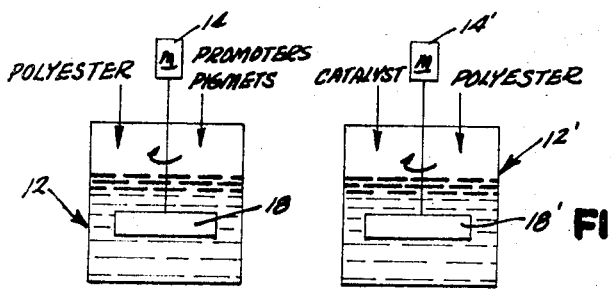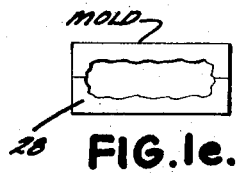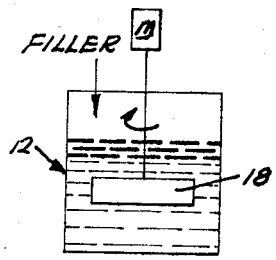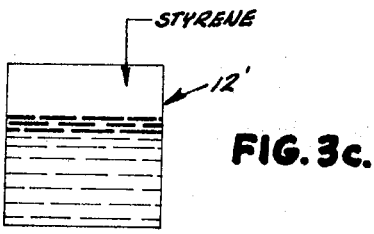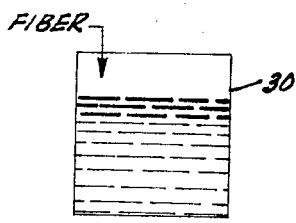

POLYESTER RESIN COMPOSITION AND METHOD OF MAKING THE SAME

This application is a continuation of application Ser. No. 782,188, filed Dec. 9, 1968, now abandoned.

This disclosure relates to a moldable polyester composition and to a method for making high fidelity surface reproduction molding compositions.

Synthetic materials have been used for many years as a substitute for wood, slate and other natural materials. Many plastic materials have been sought and used as wood substitutes. The plastic materials have the advantage of being cast or molded into a desired final shape without expensive hand labor operations. Some plastic materials lend themselves to finishing in the same manner as wood so that the plastic parts have a wood surface appearance.

The beauty of natural material such as wood lends an aura of quality to any commercial products such as furniture. It has, therefore, been an object of synthetic material manufacturers to provide compositions and techniques to reproduce parts to give the appearance, feel and sound of wood.

One type of molding material which has been used to reproduce wood texture is rigid urethane foam. The fidelity of surface reproduction with the urethane foam is quite good but the material and techniques are not adaptable to large parts. Further, the material cost is high and the final parts have low tensile and impact strength. Bubble formation at the surface of the parts complicates the use of foamed urethane still further.

Polystyrene has also been molded to reproduce wood parts. The fidelity of reproduction is excellent, but the parts feel and sound like plastic. Polystyrene parts have low impact resistance and the parts are subject to chipping and breaking.

Synthetic wood parts have also been made from blow molded or vacuum molded thermoplastic materials such as polyvinyl chloride. These parts can reproduce the surface characteristics with good fidelity but feel and sound like plastic. The parts thus produced have a hollow core which requires a filler to provide rigid parts. Another disadvantage of blow molding is that sharp corners cannot be obtained, thereby limiting the design.

Synthetic wood parts have been made from fiber reinforced polyesters. These polyesters can be pressure molded in a pre-formed mold cavity for small parts or can be used with a pre-formed fibrous matt in a hand lay-up molding operation. The lay-up operation is quite expensive and is used extensively for large parts such as automobile bodies. It is obviously much more economical to mold parts IN a pre-formed mold.

The fidelity of surface reproduction with polyester resins has been good for high pressure molding operations. High pressure molds must be made of metal and hand machined to give the desired surface effect. Thus, with high pressure molding it is not feasible to copy a natural material surface.

Low temperature molds can be made from polyesters, epoxies or room temperature vulcanizable (RTV) silicone rubber. These molds provide excellent surface fidelity reproductions. However, at low pressures, the surface fidelity of the product has been adversely affected by the high viscosity of the polyester molding compositions and the shrinkage inherent in the low pressure polyester molding methods.

Many of the problems of polyester molding occur in the mixing of filler and fiber into the base resin. Conventionally, catalyst pigments and inhibitors are mixed with the polyester resins to obtain a uniform dispersement of these addtions in the polyesters. The fillers are blended into the liquid polyester resins until the mixture becomes syrupy. During the mixing operation, the mixture becomes more viscous as more filler is added. Thus, the amount of filler which can be added to the polyester is limited by the viscosity of the polyester. After the filler has been thoroughly mixed with the polyester, chopped glass fibers are added to the high viscosity mixture. The fibers are mixed into the viscous mass by mechanical blenders which render the mixture still more viscous. Because of the viscosity of the mass, the fibrous blending operation necessarily results in degradation of the strand structures.

The viscous polyester resin mixture is then cast into a mold and cured. Pressure is applied to the mold to give good surface fidelity of the final product. With the more viscous materials, higher pressures must be used. Metal molds are generally required for higher pressures. These metal molds must be hand made and accurate surface reproduction is not feasible.

Low pressure molds can be made from silicone rubber, polyesters and epoxies. Good surface fidelity from polyester materials has not been possible with a simple process because of the high viscosity of the molding materials.

I have now unexpectedly discovered that a very low viscosity molding composition can be obtained by mixing filler with a polyester resin using a disc mixer at inordinately high speeds. The viscosity of the mixture drops rapidly when the polyester-filler mixture is subjected to shear forces at a high rate above about 2,500 lineal feet per minute. During the high shear mixing, the temperature of the polyester resin increases to about 100°–110°F, contributing to the decrease in viscosity. When the low viscosity mixture is obtained, a vinylidene-containing monomer which is polymerizable or reactable with the polyester resin is blended into the mixture. Catalysts and chopped glass fibers are then quickly blended into the heated mixture without destroying the strand integrity and the blend is then molded at low temperatures and pressues in a suitable mold.

By various aspects of this invention, one or more of the following, or other, objects can be obtained.

It is an object of this invention to provide a process for making a low viscosity polyester composition suitable for molding synthetic wood products at low pressures with high surface reproduction fidelity.

It is another object of this invention to provide a process for molding high fidelity synthetic wood products from a polyester-fiber composition at low pressures.

It is another object of this invention to provide a method for mixing filler materials with polyesters wherein the final mixture has a low viscosity.

It is a still further object of this invention to provide a simple and inexpensive process for synthetically reproducing natural material surfaces.

It is yet another object of this invention to provide synthetic wood products which have the appearance, feel and sound of wood.

Other aspects, objects, and the several advantages of this invention are apparent to one skilled in the art from a study of this disclosure, the drawings, and the appended claims.

According to the invention, there is provided a process for mixing a filler with a liquid polyester resin in a mixing zone. The mixture of filler and polyester is contacted with a shear surface which is moved at a speed greater than about 2,500 lineal feet per minute. The mixing is continued until a sharp drop in the viscosity of the mixture is observed and the temperature of the mixture is raised to 100°–120°F. At that point, a vinylidene-containing monomer, polymerizable or reactable with the polyester resin, is added to the mixture. A catalyst and then chopped fibers are blended into the composition, preferably at the above named temperature, the blending being such as to avoid destroying the integrity of the fibrous strand structure. The blend is then quickly charged to a mold cavity. The mixture is then cured at a temperature and for a time sufficient to produce a solid rigid product. Moderate pressures can be used during the curing operation.

In accordance with another embodiment of the invention, there is provided a process for molding polyester containing compositions in a mold cavity to produce high surface fidelity reproduction products. The polyester resin has uniformly dispersed therein a filler. A vinylidene containing monomer. copolymerizable or reactable with the polyester, is blended into the composition. A catalyst and chopped fibers are then blended into the mixture at an elevated temperature and the blend is quickly transferred to a mold cavity and cured to a solid mass.

The invention will now be described with reference to the accompanying drawings in which:

FIG. 1a through 1e is a schematic representation of one embodiment of the invention;

FIG. 2 is a schematic representation of a mixing shear device utilized in the invention; and FIG. 3a through 3e schematically represents a second embodiment of the invention.

Referring now to FIGS. 1a through 1e and FIG. 2, a liquid polyester resin 20 is charged into a mixing vessel 12. Promoters and pigments are also charged into the mixing vessel. A rotary disc mixer 18 having small raised bumps 19 (FIG. 2) on the bottom surface thereof is driven through a shaft 16 by a motor 14. The promoters and pigments are uniformly dispersed in the polyester.

A filler such as calcium carbonate, diatomaceous earth and the like is then added to the polyester resin 22 in mixing vessel 12 as illustrated in FIG. 1b. The filler is uniformly dispersed within the polyester resin mixture. For this purpose, the disc mixer 18 is driven at a high speed so that the outer surface thereof moves at a rate of speed of at least 2,500 lineal feet per minute, and preferably at least 5,000 lineal feet per minute. The high shear rate causes the temperature of the resin to rise to 100°–120°F. and breaks down agglomerates of filler, both of which contribute to the decrease in the mixture viscosity. After the filler has been added to the mixture, the mixing is continued until a sharp decrease in viscosity of the mixture is observed. At this point, the filler will be uniformly dispersed within the polyester resin.

As illustrated in FIG. 1c, styrene or other similar vinylidene-containing monomer is then added to the compounded polyester resin 24 and blended thoroughly therewith. The mixing can be done in a conventional manner. The styrene is added while the mixture remains at elevated temperatures and further reduces the viscosity of the mixture.

As illustrated in FIG. 1d, a catalyst and then chopped fibrous strands are added to and quickly blended with the mixture 26 within the mixing vessel 12. The mixing is done gently and while the mixture 26 is at the elevated temperature so that the integrity of the strand structure is maintained and so that there is no appreciable increase in the viscosity of the resin mixture. The resulting mixture or blend is a relatively low viscosity polyester resin which can then be charged into a mold 28 having a mold cavity for forming the desired end product. The mold can be heated prior or subsequent to the charging operation for curing the mixture to a solid rigid mass.

As an alternate procedure, the mixture can be poured directly into a heated mold and the fibrous strands added to the polyester mixure while the same is in the heated mold. The fibrous strands can be stirred briefly in the mold prior to closing the mold and curing the resin mixture.

Referring now to FIG. 3a through 3e, polyester resin, promoters and pigments are added to a mixing vessel 12. They are stirred by a rotary disc mixer 18 powered by motor 14. Filler is then added to the mixing vessel 12 and the polyester-filler composition is subjected to exceedingly high shear rates as has been described in the process represented by FIGS. 1a–1e. The rotary disc mixer is rotated at a speed high enough to produce shear rates at the outer diameter of the disc of at least 2,500 and preferably 5,000 lineal feet per minute. The shear mixing is continued until the polyester resin is heated to 100°–120°F and a sharp drop in the viscosity is observed.

In a second mixing vessel 12', catalyst and polyester are mixed with the aid of a disc mixer 18' powered by a motor 14'. Filler is then added to the polyester-catalyst mixer. In this compounding step, the mixing disc 18' is rotated at an exceedingly high speed so that the outer diameter thereof moves within the mixing vessel at a speed of at least 2,500 and preferably 5,000 lineal feet per minute. The shear mixing is continued until the temperature of the mixture is raised to 100°–120°F and a sharp drop in the viscosity is observed. At this point, styrene or another vinylidene-containing monomer is added to the mixture in the mixing vessel 12'. The styrene is uniformly blended into the mixture by conventional methods. As soon as the styrene is uniformly dispersed in the mixture, the polyester-containing composition in mixing vessel 12' is mixed with the polyester composition in vessel 12 in a mixing vessel 30 while both mixtures remain at elevated temperatures. Chopped fibrous strands are then blended into the mixture to uniformly disperse the same within the blend. The chopped fibers are mixed only long enough to uniformly disperse them in the mixture and for an insufficient time to cause the fibrous strand structure to break down.

The mixture from mixing vessel 30 is then charged into a heated mold 34 having a mold cavity conforming to the final desired product. The mold halves are closed and cured at a suitable curing temperature for a time sufficient to produce a solid rigid mass. Moderate pressures can be applied to the composition during molding.

The polyester compositions suitable for use in the invention are well known thermosetting resins derived from the reaction of at least one dihydric alcohol with at least one dicarboxylic acid, or ester forming derivative thereof, wherein at least one carboxylic acid is unsaturated, preferably an alpha, beta-unsaturation. The polyester can include a polymeric chain containing varying proportions of saturated and unsaturated acid moieties. The polyesters are dissolved in a solvent, such as styrene, which is copolymerizable with the polyesters to form a rigid solid mass.

Examples of such dihydric alcohols include: ethylene glycol, propylene glycol, the butylene glycols, diethylene glycol, triethylene glycol, the polyethylene glycols, and unsaturated glycols such as, for example, vinylethylene glycol.

Examples of alpha, beta-unsaturated dicarboxylic acids include: maleic anhydride, maleic acid, fumaric acid, citraconic anhydride, citraconic acid and itaconic acid.

Examples of saturated acids which can be used in accordance with the invention include: phthalic acid, phthalic anhydride, and tetrachlorophthalic anhydride, as well as the straight chain aliphatic dicarboxylic acids such as succinic, adipic, azelaic and sebacic acids.

Ester forming derivatives of dicarboxylic acids include: dicarboxylic acids and the anhydrides, esters and acid halides thereof, all of which are ester forming.

In a preferred embodiment of the invention, the unsaturated polyester contains substantial amounts of an isophthalic polyester. The polyesters are dissolved in a vinylidene-containing solvent which is to polymerizable and reactable therewith. The polyester and the solvent make the polyester resin.

The fillers mixed with the polyesters in the invention do not chemically combine with the polyesters. These fillers include:
Carbonates
Sulfates
Phosphates
Silica
Silicate
Micromica
Dolomite
Carborundum
Asbestos
Glass
Sandstone
Graphite
Polyolefines (polyethylene, polypropylene, polyisobutylene)
Polyvinyl chloride
Carbon black
Acetylene black
Polyacrylates
Polymethacrylates
Polyacrylonitrile
Polyvinyl acetate
Polyphthalates
Polystyrene
Polyurethane
Solid polyesters
Phenol-formaldehyde resins
Urea-formaldehyde resins
Polyformol resins
Polyamide resins Preferred fillers include amine coated calcium carbonate, Kaolin clay and bentonite. The amount of filler can vary depending on the polyester and final product used. The filler can vary from 40 to 150 parts of filler by weight per 100 parts of polyester resin. Preferably, 100 weight parts of filler is used.

The chopped fibrous strands useful in the invention are generally from one-fourth to one-eighth inch in length and include chopped glass rovings, nylon and mylar. The preferred strand length is one-eighth inch. These strands are preferably coated with well known sizing compounds. Examples of suitable reinforcing fibrous materials include Johns Manfield "Ferro HI 250" and Johns Manfield Glass Fiber Chopped Strands No. 3088.

The amount of chopped fibers added can vary generally from 30 to 40 parts by weight per 100 parts of polyester resin. Preferably, about 35 parts by weight of chopped fibers per 100 parts of polyester resin are used.

Vinylidene-containing monomers which are used in the invention to dissolve the uncrosslinked polyesters are the same compounds which are added to the final compound mixture prior to molding. Examples of such monomers include:
Styrene
Methyl styrene
Acrylonitrile
Methyl acrylate
Methyl methacrylate
Vinyl acetate
Allyl esters of phthalic, adipic, maleric, malonic, cyanuric, and pyromellitic acids.

The amount of monomer added to the filler compounded polyester resin will range from 12 to 20 parts by weight per 100 parts of polyester resin and preferably be about 15 parts by weight of monomer.

The promoters used in the invention are well known compounds which lower the temperature at which the cure can take place. The promoter used will generally depend on the catalyst used. Examples of promoters are metal organic compounds such as cobalt napthanate and cobalt octoate, alkyl substituted anilines such as NN' dimethyl aniline.

The amount of promoters used will vary from 0.1 to 1.0 parts by weight per 100 parts of polyester resin.

The catalysts which can be used in the invention include well known peroxides such as methyl ethyl ketone peroxide, cumene hydroperoxide, benzoyl peroxide and many others.

The amount of catalyst can vary from 0.25 to 2.0 weight parts per 100 weight parts of polyester resin. Preferably, one weight part of catalyst per 100 parts of polyester resin is used.

Any conventional pigments can be used in carrying out the invention. If desired, no pigment can be used and the final article can be finished by conventional wood surface finishing techniques. The amount of pigment depends on the intensity of color desired and the type of color. Generally, about one part of pigment by weight per 100 weight parts of polyester resin is employed.

Inhibitors such as tertiary butyl catechol can also be added to the original polyester resin to inhibit polymerization of the resin at low temperatures during the mixing operation.

After placing the compounded polyester into a mold, the composition is cured at a temperature and for a time sufficient to form a solid mass. The polyester resin can be completely cured in the mold or can be removed from the mold as soon as it sets up, and further cured under heat to a rigid mass. The time and temperature of curing will vary depending on the catalyst, promoters and type of polyester resin used. Generally, for isophthalate polyesters the cure temperature can be in the range of room temperature to 300°F. Preferably the molds are heated to an elevated temperature, such as 100° to 120°F, and the molding composition is at a temperature of 100° to 120°F when it is added to the mold. A room temperature cure can be carried out in a short time. Generally, the mass sets up to a hardened substance within ten minutes. The parts can then be removed from the molds and heated in an oven to cure the parts to a rigid solid mass. The cure time can be from about 30 minutes to 5 hours depending on the catalyst used and the temperature of the cure.

The pressure used within the mold is very low compared to conventional polyester molding methods. The pressure can be less than 100 psi and preferably between 30 and 50 psi. This low molding pressure permits low pressure molds to be used. As set forth hereinbefore, the low pressure molds are susceptible to high surface fidelity reproductions. It has been found that the compositions of the invention give good dimensional stability as well as high surface reproductions for large parts as well as small parts at low molding pressures.

The molds can be heated before or after charging of the compounded polyester resins thereto. The polyester resins are preferably at an elevated temperature before charging them to the mold.

The mixing step for the dispersion of the filler into the polyester is quite important in reaching the final product. The mixing takes place by contacting the polyester resin with a shear surface at a speed of at least 2,500 lineal feet per minute within the mixing zone. It has been found that at lower speeds of rotation of a disc mixer, the viscosity does not decrese when the filler is added. The mixing preferably is done with a conventional rotary disc mixer with a roughened bottom surface. The mixing of the filler into the polyester is continued until the temperature of the mixture rises to about 100° to 120°F and a sharp drop in viscosity is observed. The reason for the viscosity drop is believed to be related to the breakdown of filler agglomerates. It has been discovered that the viscosity will not decrease unless these high shear forces are used during the filler mixing step. Although the viscosity is decreased by the temperature rise, there is a further viscosity decrease due to the high shear action. For example, with a 6 inch rotary disc mixer rotating below about 1,500 rpm, the viscosity of the liquid polyester resin increases rather than decreases as the filler is added. Preferably, the shear speeds of at least 5,000 lineal feet per minute are used to obtain the sharp decrease in viscosity during the filler blending or mixing step. Generally mixing at the high shear speed is carried out in 5 to 10 minutes.

While it is preferred to obtain a concurrent temperature rise during the filler mixing step, it is within the scope of the invention to cool the mixing vessel to maintain a low temperature during the high shear filler mixing operation.

The addition of the vinylidene containing monomer can be at low speeds so long as the styrene is thoroughly blended into the polyester-filler composition at a short time. Generally, one to two minutes at moderate mixing speed is sufficient to adequately disperse the monomer into the polyester-filler liquid. The vinylidene containing monomer further decreases the viscosity of the polyester resin-filler dispersion.

The blending of the fibrous strands into the polyester is sufficient to disperse the strands into the mixture without destroying the integrity of the strand structure. This is preferably done with a slow blending operation for a very short time. The viscosity of the liquid should not increase significantly during the fibrous strand blending step.

The temperature of the liquid polyester resin composition is preferably maintained at an elevated temperature throughout the entire mixing operation. The blending of the chopped fibers into the polyester resin composition at the elevated temperature facilitates the blending of the strands into the liquid resin without degradation of the strand structure. The strands are easily dispersed into the low viscosity liquid polyester with a minimum of mixing. Further, the elevated temperature gives improved "wet out" of the strands by the polyester resin, thereby producing better adhesion of the glass to the cured polyester resin. Still further, the elevated temperature of the mixture promotes a faster cure to hasten the molding cycle.

EXAMPLE 1

One hundred pounds of a liquid isothalate polyester "Dion 327"[1] was placed into a mixing vessel. Into this liquid was stirred 0.5 pounds of cobalt napthanate and 1.0 pounds of a pigment. The mixture was stirred with a rotary disc mixer at conventional speeds for 3 to 5 minutes.

One hundred pounds of an amine coated calcium carbonate was added slowly to the mixing vessel while a 6 inches rotary disc mixer such as illustrated in FIG. 2 was rotated at 3,500 rpm producing high shear forces within the mixing vessel. The outer circumference of the mixing disc thus moved at a speed of about 5,500 lineal feet per minute. After about 5 to 10 minutes, a sharp decrease in viscosity of the mixture was observed. The temperature of the mixture was about 110°F. At this point, the mixing was stopped and about 15 pounds of styrene monomer was added and quickly blended into the liquid in the mixing vessel while the mixture was hot. One percent methyl ethyl ketone proxide was then added to the hot mixture and stirred moderately. Thirty-five pounds of Johns Manfield "Ferro HI 250"[2] was blended by a hand stirring operation into the hot mixture. After about 15 to 20 seconds, the mixing was discontinued and the mixture was then poured into a mold cavity. The mold was heated to about 110°F. During this time the mold pressure was about 50 psig.

After about 6 minutes curing time, the mold was opened and the products removed. The products were subjected to a further cure under heat lamps for about 2 hours until the part formed a rigid solid mass. When cured the parts had good surface fidelity, had the feel and sound of wood. The product was strong and chip resistant.

1. An isothalate polyester dissolved in styrene sold by Diamond Shamrock Company of Redwood City, California. The styrene forms 35 percent by weight of the solution.

2. Chopped glass fibrous strands one-fourth to one-eighth inch long sold by Johns Manfield Company.

EXAMPLE 2

Fifty pounds of "Dion 327" [1] was mixed with 0.5 pounds of cobalt napthanate and 1.0 pounds of pigment. To this mixture 50 pounds of an amine coated calcium carbonate was added and subjected to high shear stress as in Example 1 until a sharp drop in viscosity and an increased temperature was observed.

In a second mixing vessel 50 pounds of "Dion 327" [1] was mixed with one pound of methyl ethyl ketone peroxide. Fifty pounds of amine coated calcium carbonate was added and subjected to high shear stress of about 5,500 lineal feet per minute as in Example 1 until a sharp decrease in viscosity and an increase in temperature was observed. About 15 pounds of styrene was then quickly blended into the mixture in the second vessel. The mixture in the two vessels was then combined while both were still hot and about 35 pounds of Johns Manfield "Ferro HI 250" [2] was blended quickly into the liquid mixture in the same manner as in Example 1. The mixture was then cast into a mold cavity heated to about 110°F. The mold was closed and subjected to about 50 psig pressure for about 5–7 minutes. The article was then removed and heated to about 250°F for about 1 hour to cure the mixture to set to a rigid solid mass. The product, when cured, was the same as that produced in Example 1.

With the use of the invention, a low pressure polyester molding composition can be used to make high fidelity surface reproduction products. The use of the low viscosity inventive composition permits polyester molds to be used so as to ensure high fidelity surface reproduction and control of the shrinkage of the product.

Reasonable variation and modification are possible within the scope of the foregoing disclosure, the drawings, and the appended claims without departing from the spirit of the invention.

I claim:

1. In a process for mixing a filler with a liquid cross-linkable polyester resin solution in a mixing zone, the improvement which comprises: contacting the mixture of said filler and said liquid polyester resin solution with a shear surface, and moving said shear surface within said mixing zone at a high rate of speed sufficient to break down agglomerates and sufficient to sharply decrease the viscosity of the mixture when the filler is dispersed in said liquid polyester resin solution for a period of time extending beyond said contacting and moving step.

2. A process according to claim 1 wherein said shear surface is moved in said mixing zone until the temperature of said mixture increases above about 100° F, and the viscosity of said mixture decreases, the movement of said shear surface is then discontinued, and chopped fibrous material is blended into the mixture at said elevated temperature.

3. A process according to claim 2 wherein a vinylidene containing monomer copolymerizable with said liquid polyester resin solution is blended into said mixture of liquid polyester resin solution and filler prior to the addition of the fibers thereto and subsequent to the mixing of said filler and said liquid polyester resin solution.

4. A process according to claim 1 wherein said polyester contains at least one saturated acid moiety.

5. A process according to claim 1 wherein said shear surface is moved at a speed equivalent to rotating a disc having an outer diameter such that the outer diameter of the disc moves at a speed of at least 2,500 lineal feet per minute.

6. In a process for molding polyester containing compositions in a mold cavity to produce high surface fidelity reproduction products, wherein a liquid cross-linkable polyester resin solution is blended with fillers and chopped fibers, the improvement which comprises: uniformly dispersing the filler in said liquid polyester resin solution according to the process of claim 1 and then blending into the dispersion a vinylidene containing monomer reactable with said cross-linkable polyester resin solution, then blending said chopped fibers into said mixture and transferring the thus blended mixture to a mold cavity, and curing the mixture to a solid mass.

7. A process according to claim 6 wherein the amount of said vinylidene monomer blended into said liquid polyester solution and filler dispersion is in the range of 12 to 20 parts by weight of said monomer per 100 parts of polyester by weight.

8. A process according to claim 7 wherein said vinylidene containing monomer is styrene.

9. A process according to claim 6 wherein during said step of dispersing said filler into said liquid polyester resin solution, said mixture of polyester and filler is subject to high shear action to heat said mixture to an elevated temperature above about 100° F.

10. A process according to claim 6 wherein about 40 to 150 parts of filler per 100 parts of liquid polyester resin solution by weight are added to said liquid polyester resin solution.

11. A process according to claim 6 wherein the amount of said chopped fibers added to said liquid polyester resin solution is in the range of 30 to 40 parts by weight per 100 parts by weight of said liquid polyester resin solution.

12. A process according to claim 11 wherein said chopped fibers comprise glass fibers whose length is in the range of one-eighth to one-fourth inches.

13. A process according to claim 6 further comprising mixing with said liquid polyester resin solution a compound which promotes the reaction between said liquid polyester resin solution and said styrene.

14. A process according to claim 13 wherein said reaction promoting compound is at least one compound selected from the group consisting of organic cobalt compounds and dialkyl anilines.

15. A process according to claim 6 wherein a catalyst is mixed with said liquid polyester resin solution prior to said filler blending step, and a liquid second polyester resin solution blend is added to said first mentioned liquid polyester resin solution blend prior to said chopped fiber blending step, said second liquid polyester resin solution blend comprising a liquid polyester resin solution having uniformly dispersed therein catalytic promoters and filler.

16. A process according to claim 6 wherein a catalyst is added to said liquid polyester resin solution just prior to blending said chopped fibers into said liquid polyester resin solution.

17. A process according to claim 6 wherein said mixture is subjected to a pressure less than 100 psi within said mold cavity during said curing step.

18. The product of claim 6.

19. The product of claim 8.

20. In a process for molding a polyester composition to produce high fidelity surface reproduction parts, wherein a liquid isopthalate cross-linkable polyester resin dissolved in styrene is mixed with a catalyst, a calcium carbonate filler, and chopped fibers, said mixture is charged to a mold and cured to a solid mass, the improvement which comprises: uniformly dispersing said filler into said liquid polyester resin solution by contacting said filler and said liquid polyester resin solution with a shear surface having an outer diameter and moving said shear surface at a high speed such that the said outer diameter of said shear surface moves at at least 2,500 lineal feet per minute, and then blending said catalyst and said chopped fibers into said filler-containing polyester resin solution.

21. A process according to claim 20 wherein said polyester resin is at an elevated temperature above 100° F. during the dispersion of said filler into said polyester resin.

22. A process according to claim 21 wherein said polyester resin containing said filler is at an elevated temperature above about 100° F. during the blending of said catalyst into said filler containing polyester resin.

23. A process according to claim 20 wherein said polyester resin containing said filler is at an elevated temperature above about 100° F. during the blending of said catalyst into said filler containing polyester resin.

24. A process according to claim 23 wherein said polyester resin containing said filler and said catalyst is at an elevated temperature above about 100° F. during the blending of said chopped fibrous strands into said filler containing polyester.

25. A process according to claim 22 wherein said polyester resin containing said filler and said catalyst is at an elevated temperature above about 100° F. during the blending of said chopped fibrous strands into said filler containing polyester.

26. A process according to claim 20 wherein said polyester resin containing said filler and said catalyst is at an elevated temperature above about 100° F. during the blending of said chopped fibrous strands into said filler containing polyester.

27. A process according to claim 26 wherein the speed and the duration of the blending of said chopped fibrous strands into said filler-containing polyester is such that substantial degradation of the strand structure is not caused.

28. The product of claim 20.

29. A process according to claim 20 in which the outer diameter of said shear surface is moved at at least 5,000 lineal feet per minute.

30. The process of claim 1 in which said contacting step comprises introducing a mixing disc having an outer diameter into said mixing zone and said moving step comprises rotating said disc such that its outer diameter moves at a speed of at least 2,500 lineal feet per minute.

31. The process of claim 30 in which about 40 to 150 parts by weight filler are mixed with about 100 parts by weight of said liquid polyester resin solution.

32. The process of claim 31 in which said disc is rotated such that its outer diameter moves at a speed of at least 5,000 lineal feet per minute.

33. The process of claim 32 in which said mixture is poured into a mold after mixing.

34. The process of claim 1 in which about 40 to 150 parts by weight filler are mixed with about 100 parts by weight liquid polyester resin solution.

35. The process of claim 1 wherein said shear surface is moved at a speed equivalent to rotating a disc such that its outer diameter moves at a speed of at least 5,000 lineal feet per minute.

36. The process of claim 35 in which about 40 to 150 parts by weight filler are mixed with about 100 parts by weight liquid polyester resin solution.

37. The process of claim 36 in which said mixture is poured into a mold after mixing.

* * * * *